(12) United States Patent
Burton

(10) Patent No.: US 10,061,301 B2
(45) Date of Patent: Aug. 28, 2018

(54) TOOLPATH PLANNING PROCESS FOR CONDUCTIVE MATERIALS

(71) Applicant: PALO ALTO RESEARCH CENTER INCORPORATED, Palo Alto, CA (US)

(72) Inventor: Gregory Burton, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 350 days.

(21) Appl. No.: 14/976,250

(22) Filed: Dec. 21, 2015

(65) Prior Publication Data

US 2017/0176976 A1     Jun. 22, 2017

(51) Int. Cl.
| | | |
|---|---|---|
| *G06F 7/66* | (2006.01) | |
| *G05B 19/4099* | (2006.01) | |
| *B33Y 50/02* | (2015.01) | |
| *G05B 19/402* | (2006.01) | |
| *B33Y 80/00* | (2015.01) | |
| *B33Y 10/00* | (2015.01) | |

(52) U.S. Cl.
CPC .......... *G05B 19/4099* (2013.01); *B33Y 10/00* (2014.12); *B33Y 50/02* (2014.12); *B33Y 80/00* (2014.12); *G05B 19/402* (2013.01); *G05B 2219/36342* (2013.01); *G05B 2219/49023* (2013.01)

(58) Field of Classification Search
CPC ......... B33Y 50/00; B33Y 30/00; B33Y 40/00; B33Y 70/00; B33Y 50/02; B33Y 10/00; B33Y 80/00; G05B 19/0426; G05B 19/4099; G05B 19/402
See application file for complete search history.

(56) References Cited

U.S. PATENT DOCUMENTS

| | | | | |
|---|---|---|---|---|
| 6,421,820 | B1 * | 7/2002 | Mansfield | G03F 1/36 378/35 |
| 6,816,170 | B1 * | 11/2004 | Udeshi | G06T 3/403 345/472 |
| 6,823,230 | B1 * | 11/2004 | Jamalabad | G05B 19/4099 700/119 |
| 6,823,320 | B1 | 11/2004 | Rubin | |

(Continued)

OTHER PUBLICATIONS

Vona et al. "Voronoi Toolpaths for PCB Mechanical Etch: Simple and Intuitive Algorithms with the 3D GPU," Robotics and Automation, 2005, ICRA 2005, In Proceedings of the 2005 IEEE International Conference, IEEE 2005.

*Primary Examiner* — Alonzo Chambliss
(74) *Attorney, Agent, or Firm* — Miller Nash Graham & Dunn LLP

(57) ABSTRACT

A method of generating a tool path for an additive manufacturing process, the tool path having an input polygon for a thick region, and an input path for a wire region. The method includes offsetting the input polygon by a minimum step over distance, creating a set of contour parallel offset lines, computing path segments from a medial axis transform of the input polygon, computing a dilation of the medial axis path by a radius approximately half the step over distance, producing a dilated medial axis, clipping the contour parallel offset paths by the medial axis path, producing, and recursively connect the medial axis paths with the clipped contour parallel paths.

12 Claims, 15 Drawing Sheets

(56) References Cited

U.S. PATENT DOCUMENTS

| | | | | |
|---|---|---|---|---|
| 7,833,001 B2* | 11/2010 | Silverbrook | ............ | B22F 3/008 |
| | | | | 264/113 |
| 8,161,426 B2* | 4/2012 | Morales | .................... | G03F 1/70 |
| | | | | 716/55 |
| 8,295,972 B2* | 10/2012 | Coleman | .......... | G05B 19/40937 |
| | | | | 700/173 |
| 8,825,438 B2* | 9/2014 | Anderson | .............. | G01B 21/04 |
| | | | | 702/150 |
| 9,164,503 B2* | 10/2015 | Bolin | ................. | G05B 19/4093 |
| 2010/0087949 A1* | 4/2010 | Coleman | .......... | G05B 19/40937 |
| | | | | 700/189 |
| 2015/0197063 A1* | 7/2015 | Shinar | .................... | G06F 17/50 |
| | | | | 700/98 |

* cited by examiner

TOOLPATH PLANNING PROCESS FOR CONDUCTIVE MATERIALS

FIELD OF THE INVENTION

This disclosure relates to 3D additive printing, more particularly to toolpath planning for conductive materials used in 3D printing.

BACKGROUND

Typically, materials extruded from 3D printers form structural components or sacrificial elements. The structural materials form some part of the finished printed product and the sacrificial elements typically form support structures for the other printed components and then are discarded. Some printers simultaneously print multiple materials, with different Young's modulus properties, conductive inks for wire, conductive pads, antenna, etc. and picked and placed chips.

In addition, circuit designs often contain a mix of narrow regions, approximately the bead width of the extruded material, as well as thicker regions which require multiple passes along a tool path to fill. Most tool path patterns for extruded, additive manufacturing consist of some mix of contour-parallel offsets of the part boundary, and parallel, zig-zag lines. Zig-zag lines typically consist of contour parallel lines for surface quality and zig-zag for simplicity.

However, to avoid excessive buildup of material, tool path patterns have a minimum spacing constraint that limits how close tool path lines can come to each other. Depending upon the geometry of the object to be printed, using zig-zag or contour parallel patterns and guaranteeing minimum spacing may mean that object are printed with large gaps and narrow regions, 1 bead thick, cannot be printed at all.

While patents exist the mention pattern generation for narrow features in a model, such as in U.S. Pat. No. 6,823,320, and Vona, et al. "Voronoi Toolpaths for PCB Mechanical Etch: Simple and Intuitive Algorithms with the 3D GPU," *Robotics and Automation, 2005, ICRA 2005. Proceedings of the 2005 IEEE International Conference on,* IEEE 2005), they do not address the problem of guaranteeing a good conductive bond to function as a conductive wire, antenna, etc. These approaches focus on generating a space filling curve.

These approaches use the Medial Axis Transform to divide a region, into narrow and thick regions. The narrow regions are filled with a tool path pattern that follows their medial axis. The thick regions are filled using some combination of contour parallel and zig-zag patterns. However, while superficially the entire polygon is filled with material, the conductive bond between the pattern through the narrow region, sometimes referred to as the wire region, and the thick region may be poor or not even function. Most commercial tool path solutions do not even do this, though they just leave narrow regions unprinted.

SUMMARY

One embodiment is a method of generating a tool path for an additive manufacturing process, the tool path having an input polygon for a thick region, and an input path for a wire region. The method includes offsetting the input polygon by a minimum step over distance, creating a set of contour parallel offset lines, computing path segments from a medial axis transform of the input polygon, computing a dilation of the medial axis path by a radius approximately half the step over distance, producing a dilated medial axis, clipping the contour parallel offset paths by the medial axis path, producing, and recursively connect the medial axis paths with the clipped contour parallel paths.

DETAILED DESCRIPTION OF THE EMBODIMENTS

Figure 1:
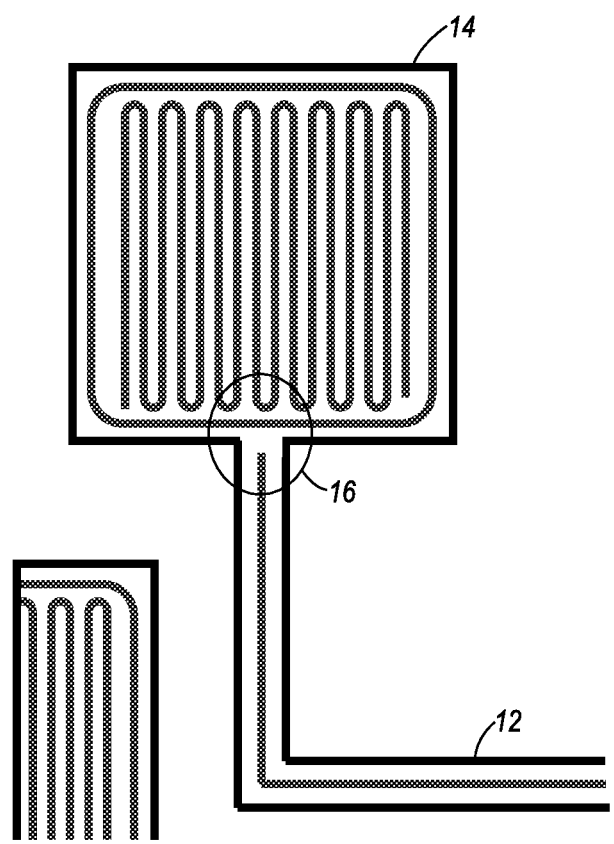
FIG. 1 shows a prior art tool path for a large region to be filled and a wire region.

FIG. 1 shows an example of a printed contact pad and wire as possibly performed by current 3D additive printers. In the example 10 the structure to be filled has a wire portion 12 and a multi-pass portion 14. As used here, the term "multi-pass" portion means the portion of an area undergoing printing that requires multiple passes with the print head or other material deposition component to fill the space. The term "print head" as used here refers to a material deposition component used in any 3D additive manufacturing process, including jet print heads, extrusion and co-extrusion heads, etc.

In FIG. 1, the wire portion 12 and the multi-pass portion 14 connect by the region 16. In the current state of tool path planning, the system may or may not print out the wire portion, as some systems will not print features that are smaller than or equal to one bead of material being deposited. Typically, the tool path pattern fills the narrow region that follows their medial axis. The tool path pattern fills the thick regions using some combination of contour parallel and zig zag patterns. The conductive bond between the wire portion 12 and the multi-pass portion 14 may not even function, or function poorly, if the portion is even printed. The thick region is easily printed because the printing can move unimpeded around the thick region with no worries about over printing paths.

In the figures beyond FIG. 1, the solid line with dots at the corners define the boundaries of the regions to be filled with material from the print head. The inner lines show the paths to be taken by the print head to deposit the material. These lines result from what is referred to as a medial axis transform that describes the regions to be printed into polygons.

While the transform typically turns all of the portions of the region to be printed into polygons, regardless of size, the focus here lies with the connections formed between the polygons in the multi-pass region and the polygons in the wire portion. In the following discussion, the input shape used for the multi-pass region may be referred to as the input polygon and the shape used for the wire portion may be referred to as the input path.

Similarly, the below discussion may use several terms including "step over" and "offset." "Step over" as used here means the distance the print head will travel with each pass of the print head in a direction perpendicular to the travel path, also referred to as the minimum spacing.

The embodiments here produce patterns that achieve several positive results. The patterns fill an entire polygon region with a guaranteed minimum spacing or 'step over' between path lines, and attempts to achieve a maximum spacing between path lines. These last two requirements may conflict with each other. The embodiments also provide a large contact surface sufficient for desired conductivity between the wire and multi-pass regions, and prefers long, unbroken paths. A minimum inward offset distance from the input boundary to account for the bead thickness. This distance may be different from the step over distance, the minimum spacing, or the threshold for a region to be filled with a single bead, the wire region.

Figure 2:
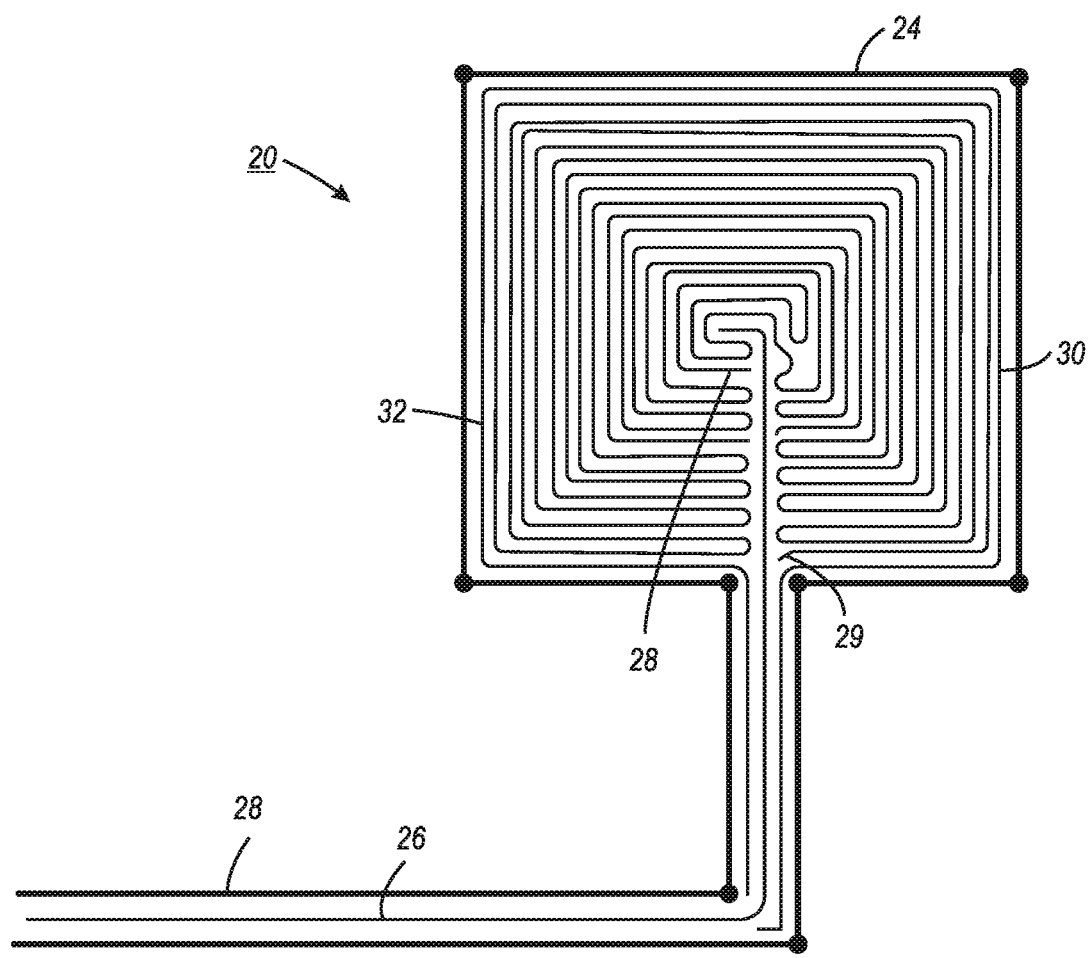
FIG. 2 shows an embodiment of a pattern having a tool path with a multi-pass region with a zig-zag contour.

FIG. 2 shows a first pattern 20 that includes a contour zig-zag line with at least one medial axis path from the wire region 22. The medial axis path 26 penetrates into what will become the multi-pass region 24, which gives rise to a need to avoid that penetrating line to prevent over printing a line that would cause material build up. The zig-zag pattern begins at 28 and ends at 29, avoiding any contact with the medial axis path 26. The paths 30 and 32 from the wire region are actually one path that outlines the outer region of the multi-pass region 24.

Figure 3:
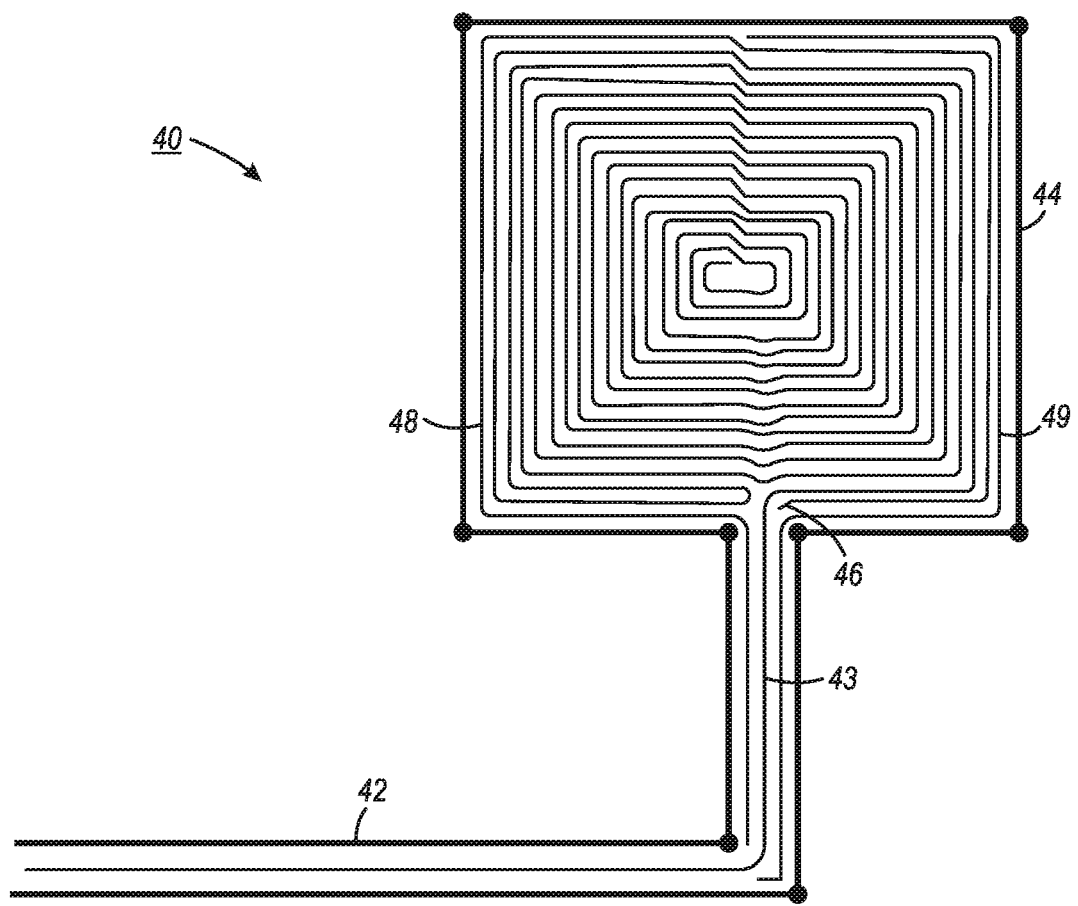
FIG. 3 shows an embodiment of a pattern having a tool path with a multi-pass region with a contour spiral.

FIG. 3 shows a second pattern 40 that includes a contour spiral. A medial axis path 43 penetrates into the multi-pass region 44 from the wire region 42. The contour spiral circles around the multi-pass region and ends at point 46. Two outer paths 48 and 49 fill in the outer boundary of the multi-pass region and anchor back at the wire region. This increases the connection between the multi-pass region and the wire region.

These two patterns and variations on them result from a same basic method, with some adjustments made to create the contour spiral pattern 40. In general the input polygon is offset inward, eroded, by the requested minimum step over distance to create of set of contour parallel offset lines. To guarantee that the resulting inward offset polygons still meet the minimum spacing requirement, the path at a particular offset distance is actually offset inward by an offset distance plus minimum spacing, and then that result is offset outward by the minimum spacing. The polygon is then repeatedly eroded and dilated. This also causes the corners of the toolpath polygons to round, generally a desired trait.

Figure 5:
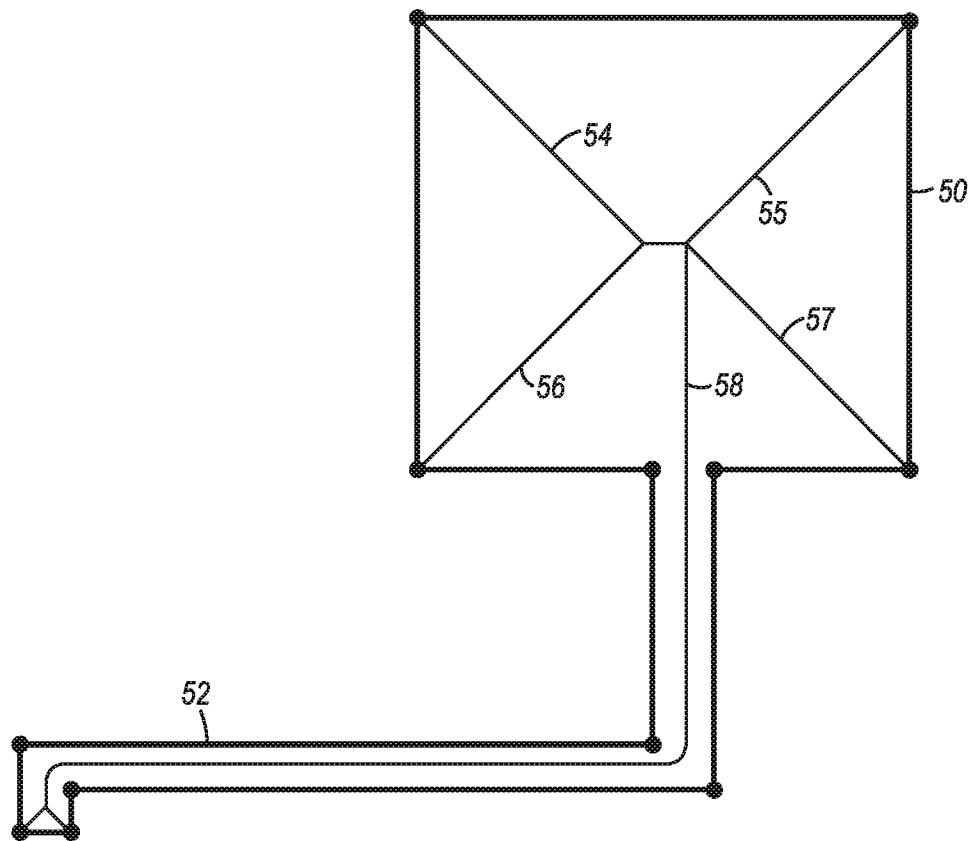
FIGS. 5 and 6 show an example of the edges of a medial axis transform for boundaries of a large region.
Figure 6:
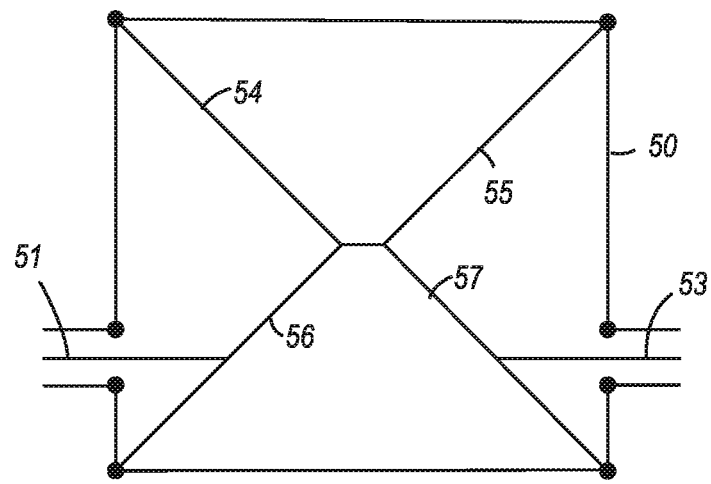
Figure 7:
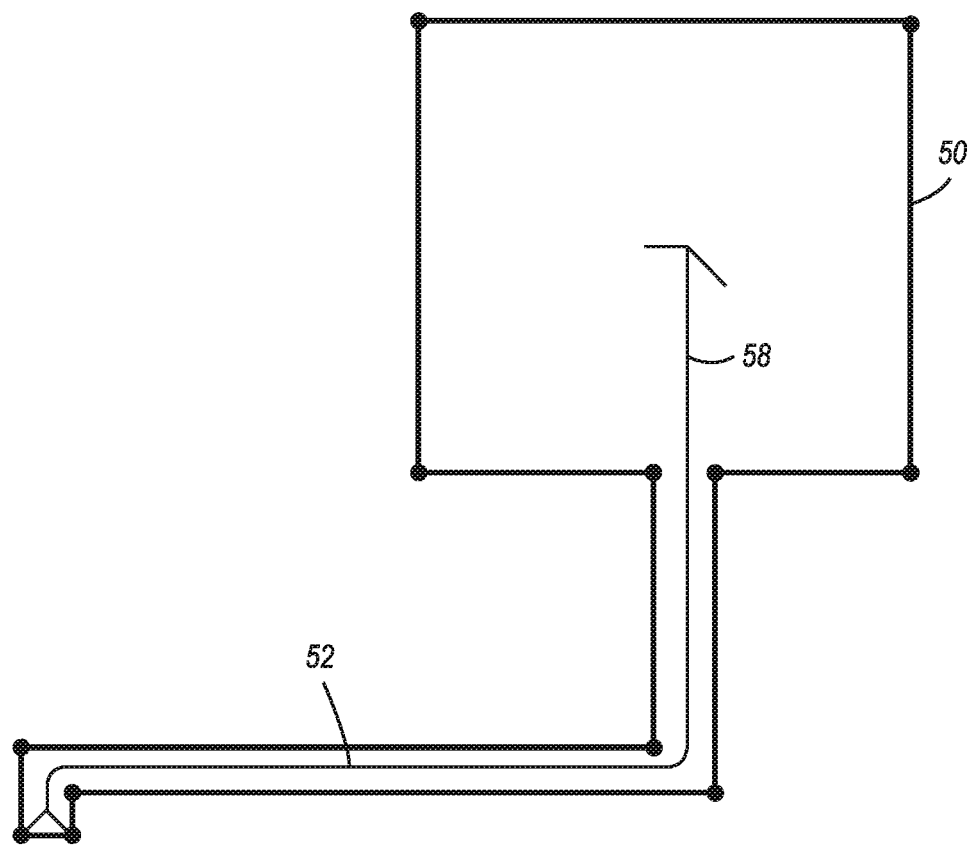
FIGS. 7 and 8 show embodiments of tool paths from a medial axis transform after application of the distance rules.
Figure 8:
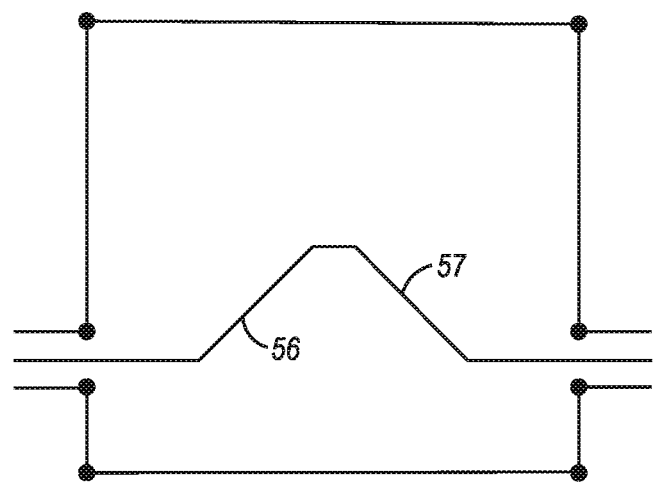

Only the portions of the medial edges that meet a minimum distance from the outer boundary are kept. This means that the medial edges for which all points on the line meet that requirement. FIG. 5 shows the resultant medial axes 54, 55, 56 and 57 of the edges from the medial axes transform. These axes all touch the boundary. FIG. 6 shows a similar diagram for an input polygon of the larger region that has two wire regions. The transforms from the edges come in contact with the medial axes from the wire regions 51 and 53. Applying the minimum distance results in the portion 58 of FIG. 7 being kept. In FIG. 8, with the two wire regions, the portions 56 and 57 are the one that stay after application of the distance rules.

Figure 9:
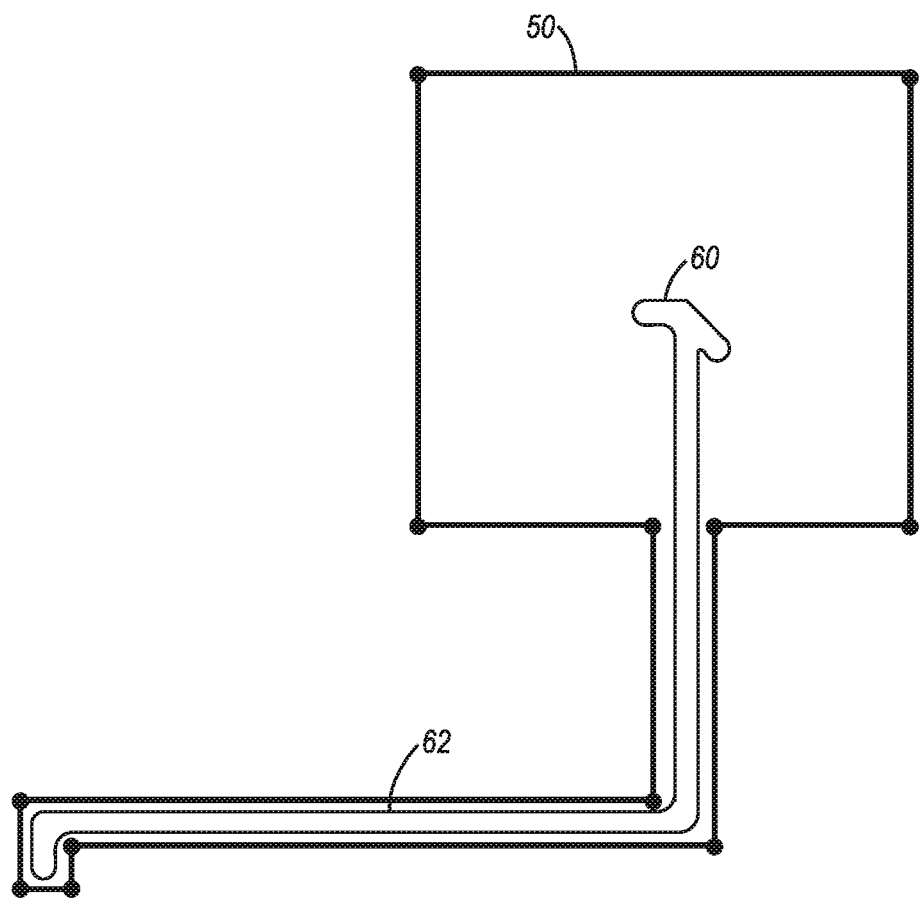
FIG. 9 shows a dilation of a wire transform by spacing rules.
Figure 10:
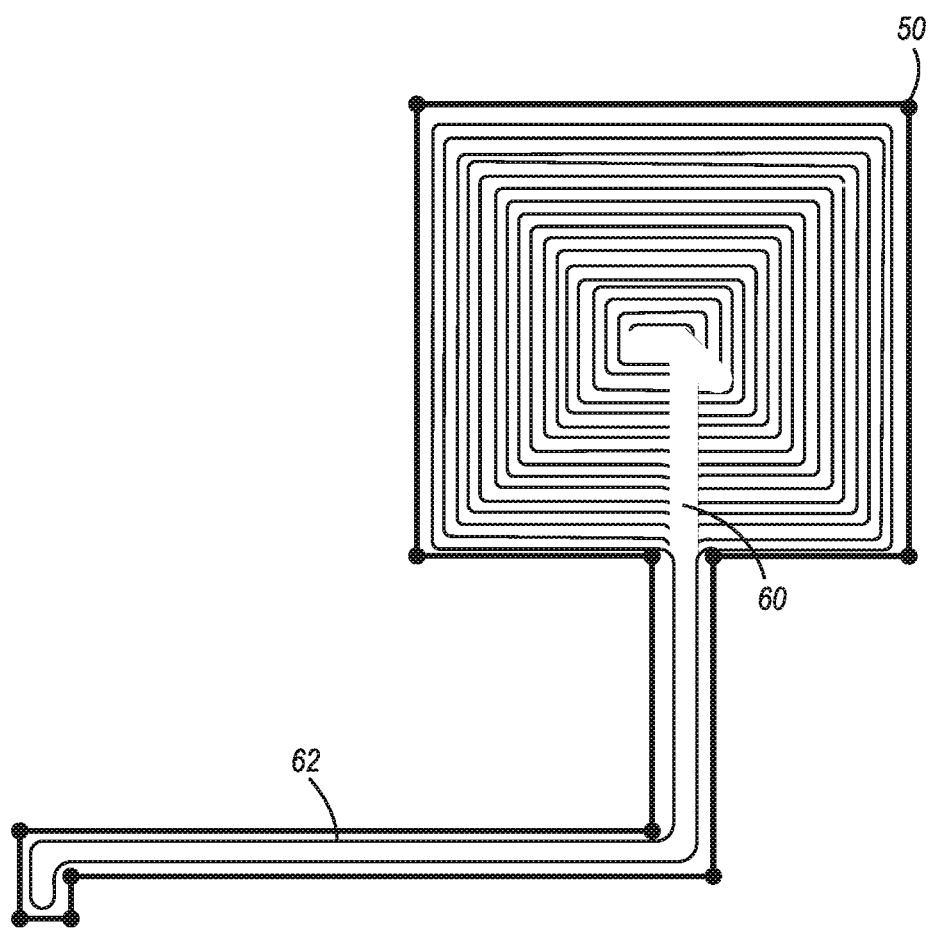
FIG. 10 shows clipping based upon a dilation of the medial axis.
Figure 11:
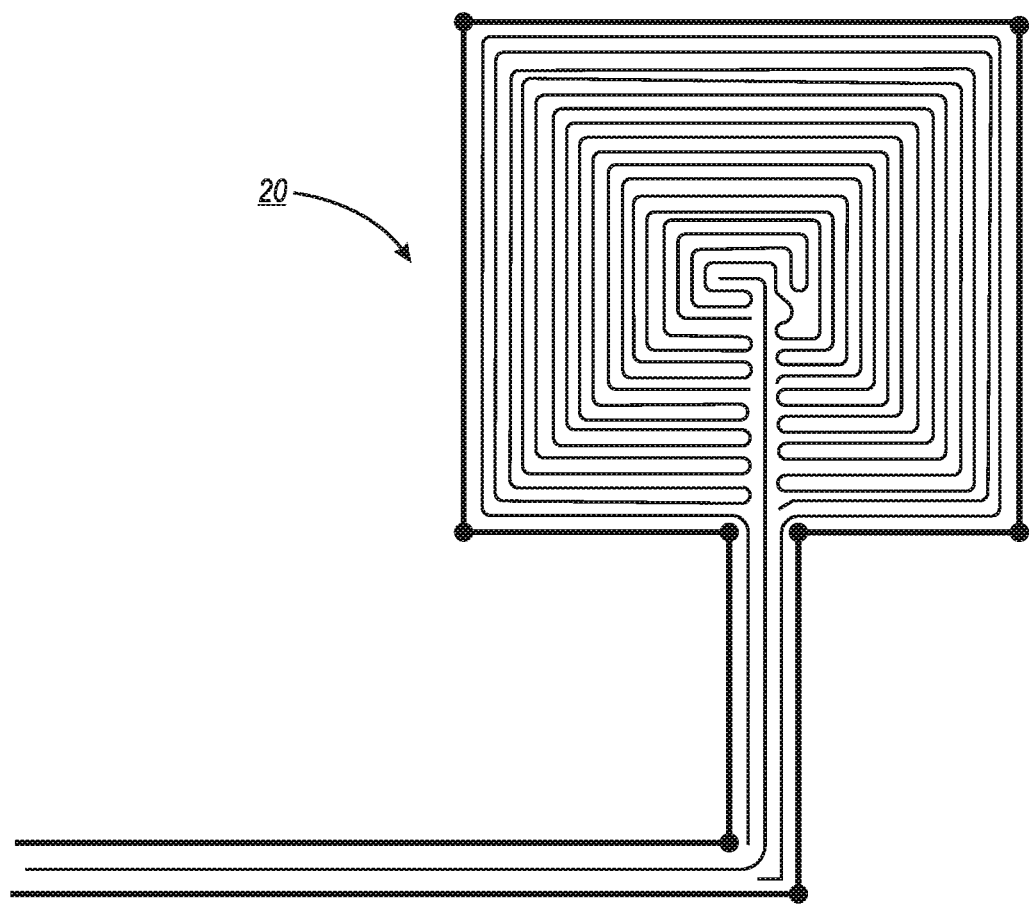
FIG. 11 shows connecting the tool path lines after the clipping.

FIG. 9 shows an embodiment of the medial axis after dilation. This will identify the region 60 where the dilation impacts the multi-pass region 50. This region needs to be clipped to make room for the tool path from the wire region 62. FIG. 10 shows the resulting clipping on the region from FIG. 4. The region 62 has also undergone clipping, where the medial axis path has been removed from this region. In FIG. 11, the paths from medial axes are recursively connected to the clipped contour parallel paths from FIG. 10.

The recursive connection occurs according to paths that are within a threshold distance of each other. Similarly, paths are only connected between vertices that have not already been connected to another path. In addition, paths are only connected if they are oriented in approximately opposite directions. This creates the zig-zag pattern and guarantees that paths do not run across the medial axis paths. FIG. 11 shows the resulting pattern 20, as previously seen in FIG. 2.

Figure 4:
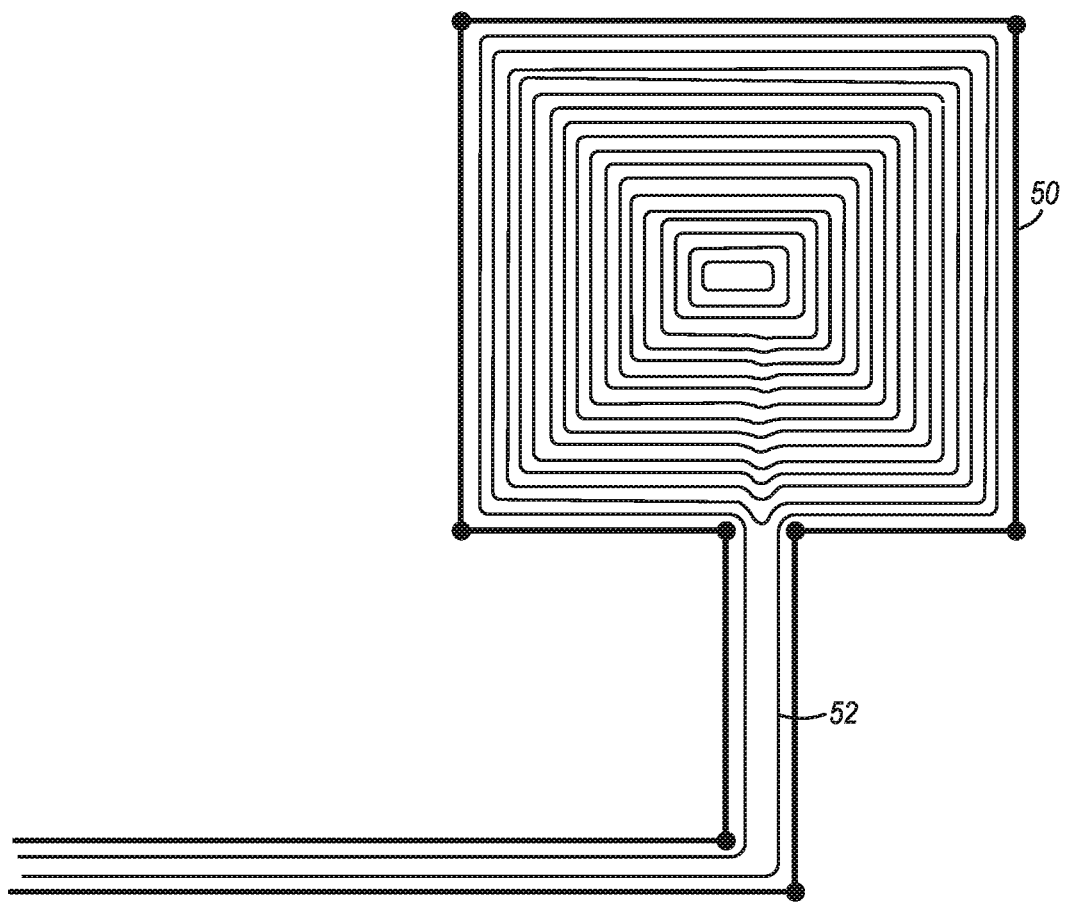
FIG. 4 shows an embodiment of successive inward offsets of the region to be filled.

The process for creating the zig-zag pattern and the process for creating the contour spiral pattern have many similar parts. Regardless of the pattern, each process includes the offsetting as shown in FIG. 4, computation of the medial axis paths discussed with regard to FIGS. 5-8, dilation of the paths at FIG. 9, clipping at FIG. 10 and then connecting as in FIG. 11. However, the figures shown are for the zig-zag pattern.

Figure 12:
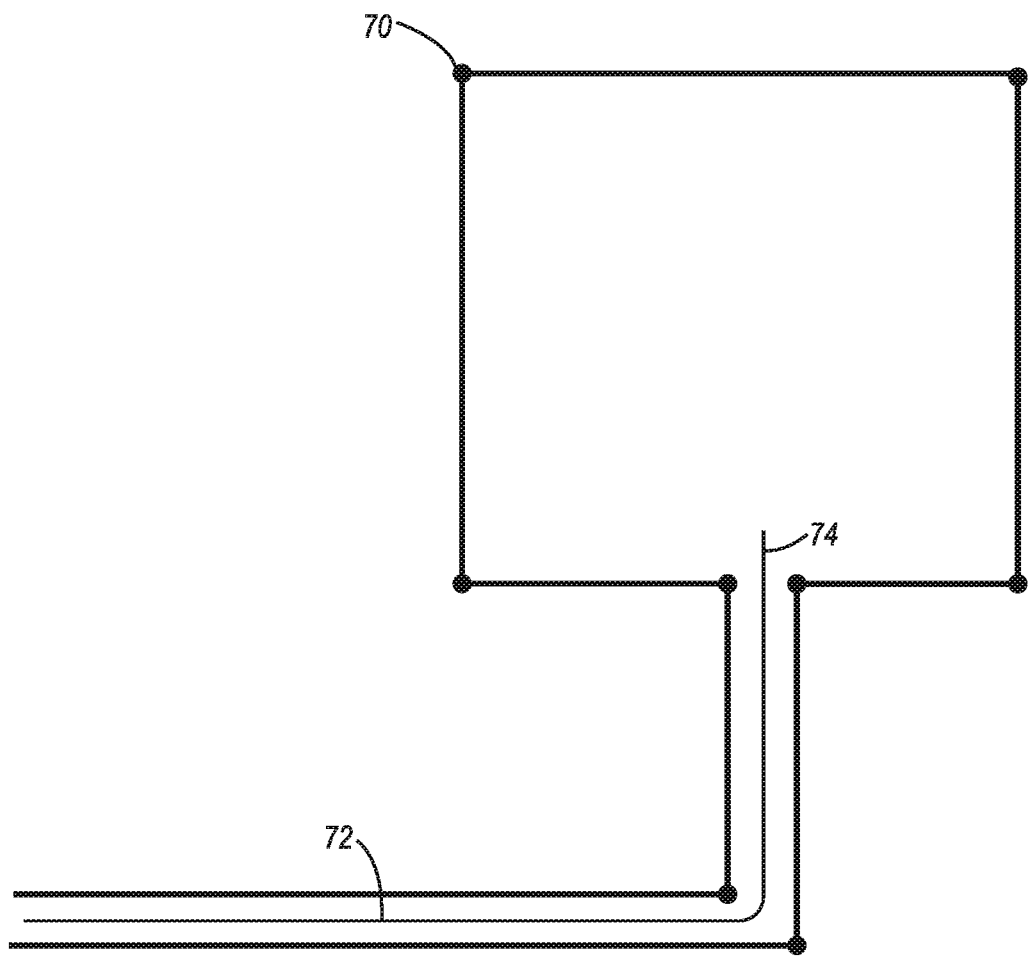
FIG. 12 shows an embodiment of tool paths from a medial axis transform for a contour spiral pattern.

FIG. 12 shows the medial axis path 74 from the wire region 72 into the multi-pass region 70 for the contour spiral pattern. The process then identifies which contour parallel paths are contained within the other contour parallel paths. The process then creates a tree structure out of the contour parallel paths so that a given path is a child of another path if all of its vertices and edges are contained within its parent. The tree structure depicts the nesting or containment of polygons within other polygons. Many existing algorithms exist for computing this tree structure.

Figure 13:
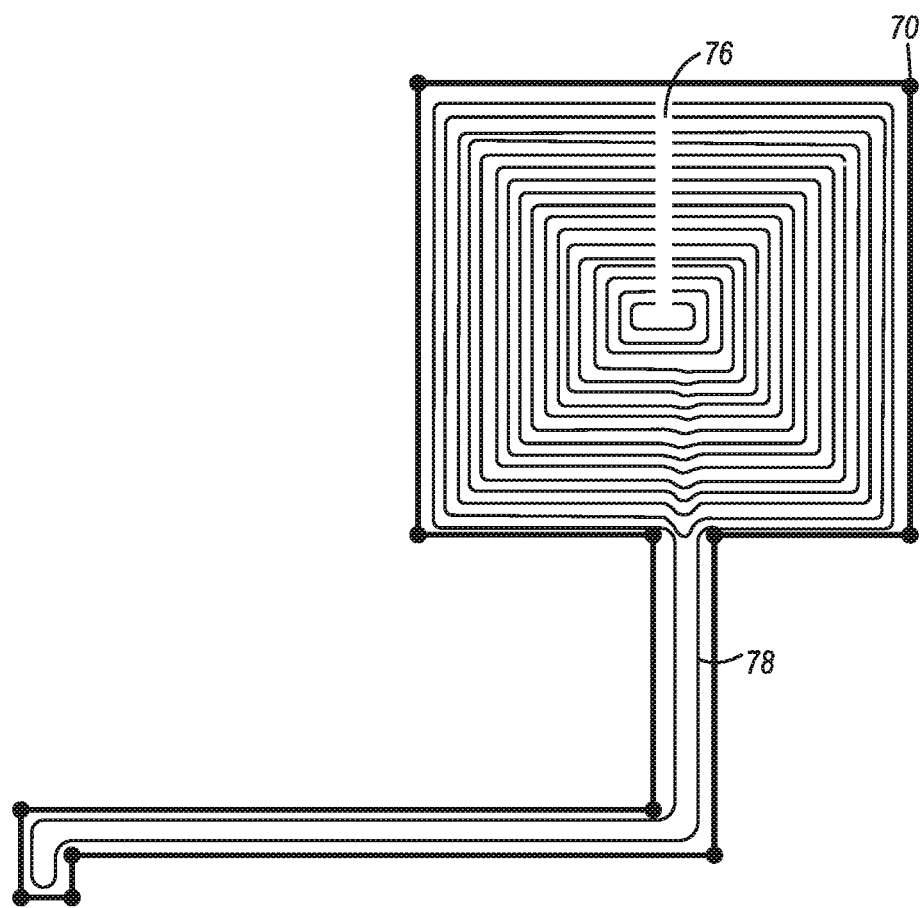
FIG. 13 shows clipping of successive inward offsets such as those dilation of the medial axis from the wire transform and clipping of the multi-pass region.

The process then creates a line between one of each inner-most loops' edges, orthogonal to the edge, and then connects this line to this loop's highest grandparent. The process then dilates that edge by a radius roughly half the step over distance. This makes the path step over distance thick. The process then clips all of the nested loops. FIG. 13 shows the result of the dilation and clipping 76 on the multi-pass portion 70 and the wire portion 78.

Figure 14:
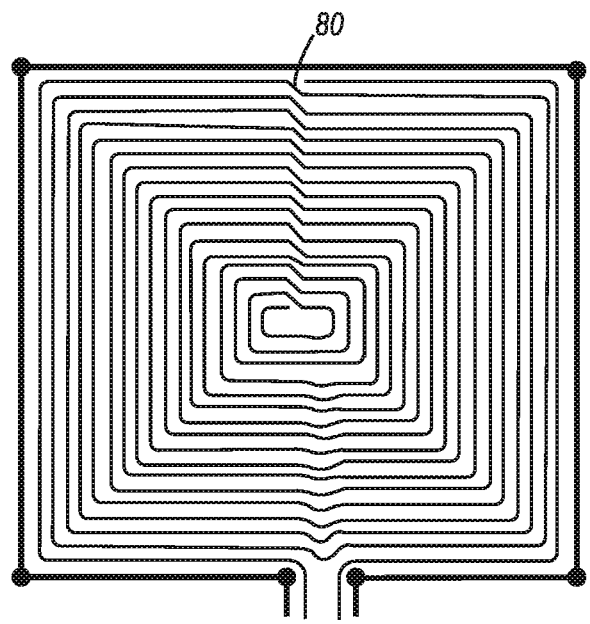
FIG. 14 shows connection of a clipping in the multi-pass region.

Using rules similar to those used to connect the lines for the zig-zag pattern, the process then connects the paths. Exceptions to the rules for the zig-zag pattern include not including the medial axis paths and only connecting paths that lie in the same direction, creating a spiraling pattern. FIG. 14 shows an embodiment of a resulting pattern, with the connecting lines such as 80.

Figure 15:
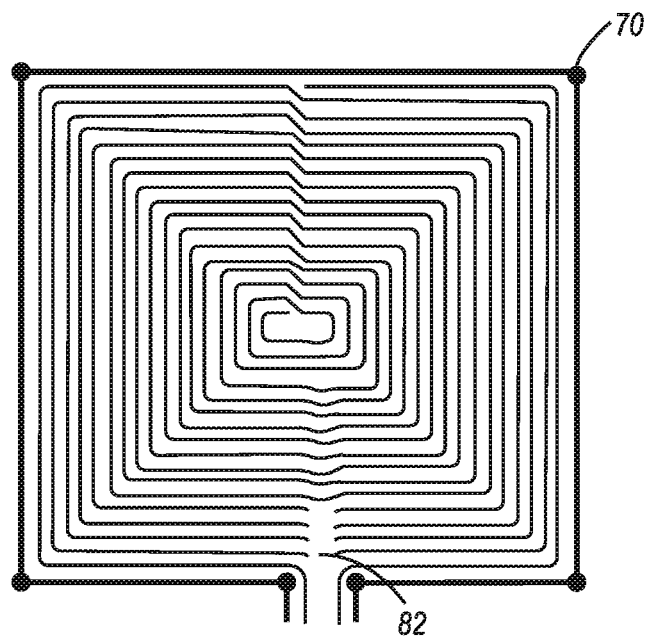
FIG. 15 shows a clipping of a multi-pass region near a wire region.
Figure 16:
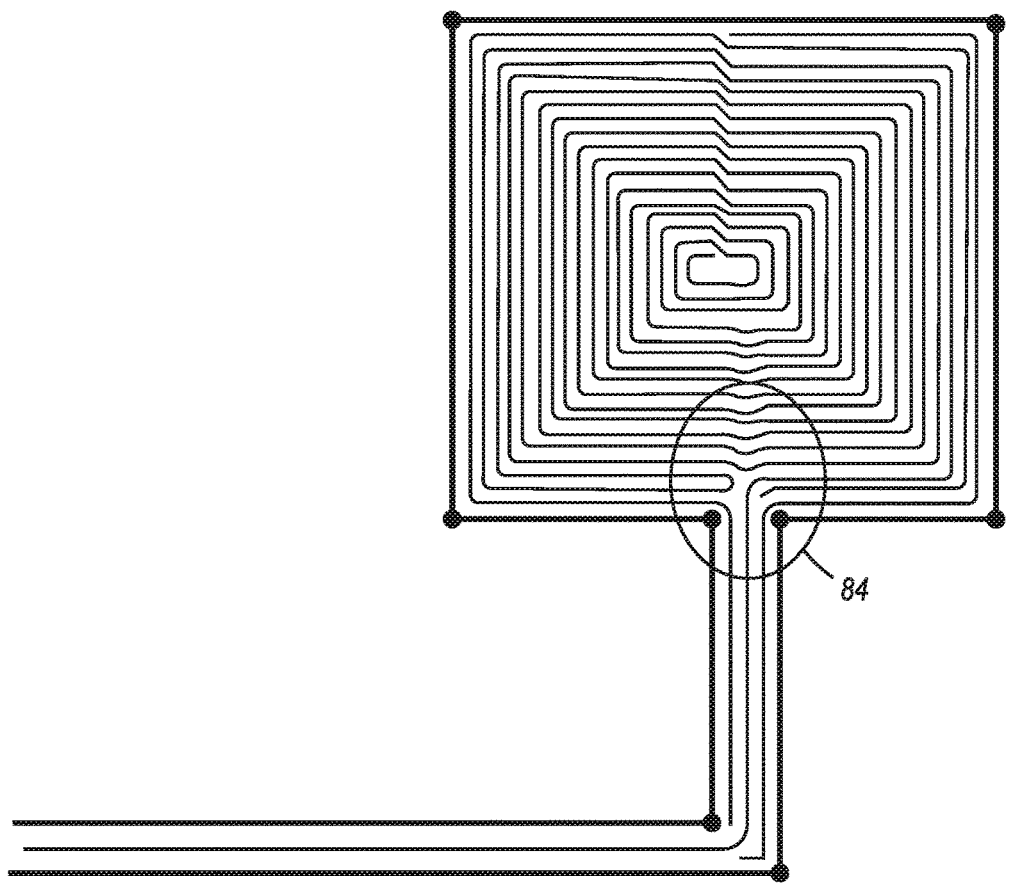
FIG. 16 shows connecting the tool path lines after clipping.

The process continues on as before, clipping the contour spiral patterns by the dilated medial axis paths created above. FIG. 15 shows the clipping 82. The clipped contour spiral patterns need connections. The same rules apply as above, connecting the nearest neighbor paths without any concern for orientation. This works as a zig-zag rule as well, but this case requires an explicit test to confirm that connecting paths do not cross medial axis lines. If the upper bound distance threshold for the medial axis lines is chosen to be near some multiple of the step over then the medial axis lines will usually connect directly to a contour spiral path. This creates a continuous unbroken path between wires and thick regions as shown in region 84 of FIG. 16. Even if a connection does not occur, the distance the medial axis path penetrates into a thick region guarantees a conductive bond.

Figure 17:
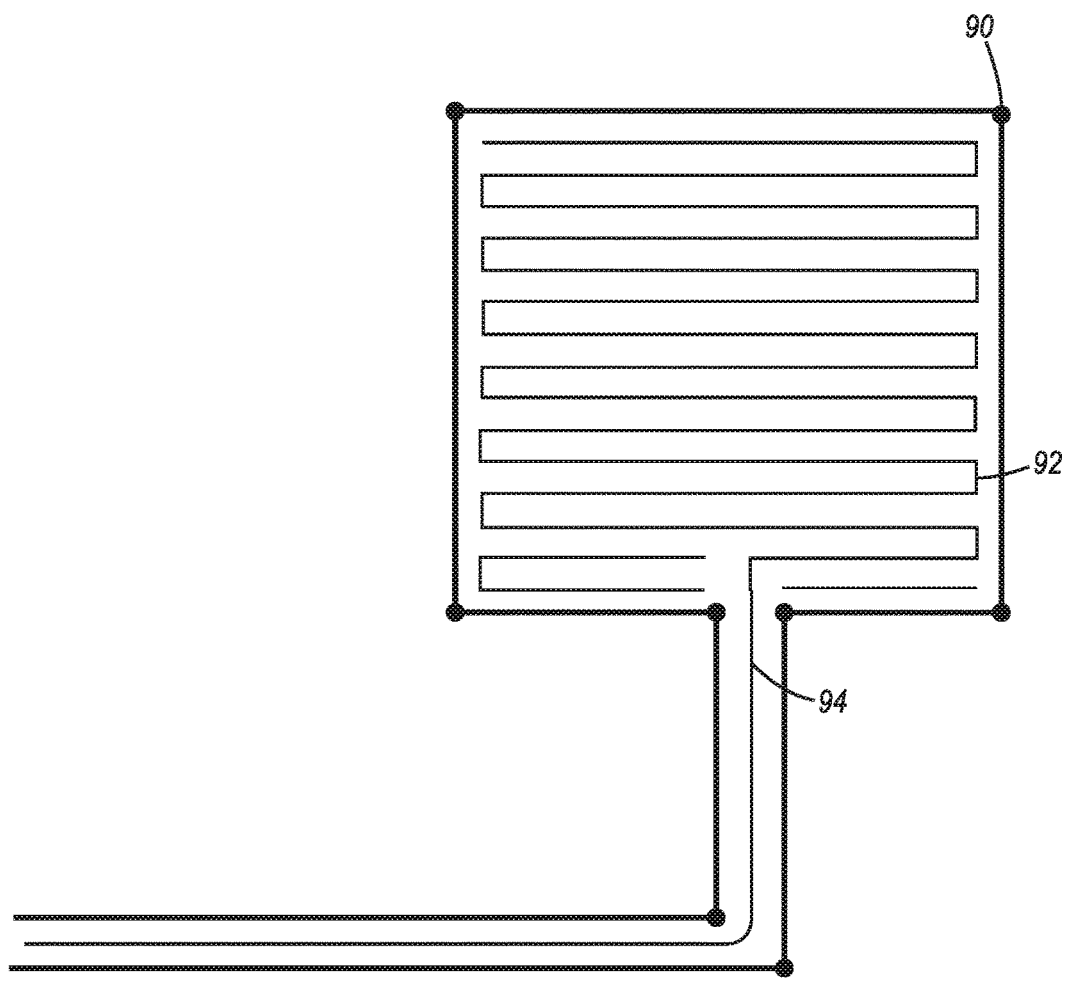
FIG. 17 shows an alternative pattern for a multi-pass region.

Other patterns may result from these processes. For example, the two patterns have additional constraints that all paths follow the local boundary contour. Relaxing this constraint, such as by doing regular zig-zag patterns, and so long as the medial axis paths are created as described above, there would be a strong, functional bond between narrow and the multi-pass regions. FIG. 17 shows an example of such an alternative path. The boundary 90 is filed with the zig-zag pattern 92 and connects to the medial axis path 94.

Figure 18:
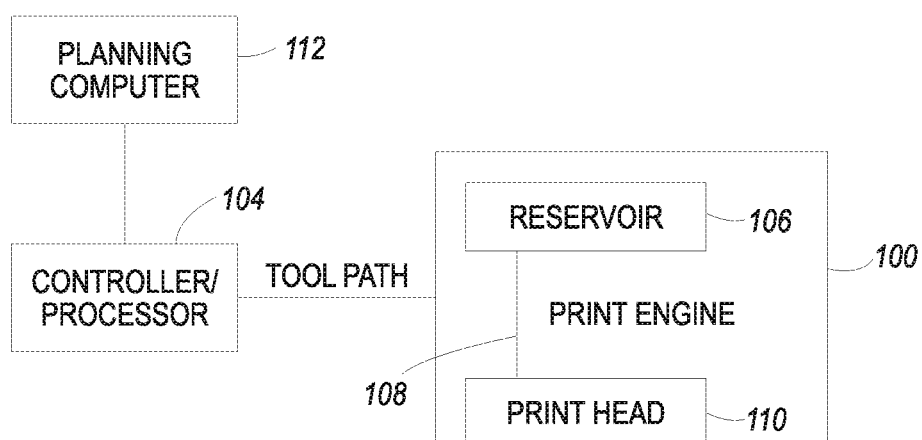
FIG. 18 shows an embodiment of a print system.

The final part of the process provides these paths to the controller of the print head. The print head follows the paths laid out above to fill the multi-pass regions and the wire regions, avoiding any over prints, but creating a good conductive bond. FIG. 18 shows an example of a printing system or a printing system simulator. A printing system simulator allows a user or enterprise to run a simulation of a 3D printing system prior to the actual printing to allow system checks and image verifications, etc. In either case, the system will have a processor or controller that will convert the tool path plan provided by software running on the processor or controller to a printed or simulated printed item.

The system of FIG. 18 has a print engine or print engine simulator 100 and a controller 104. If the print engine 100 is a printer, the system may include reservoirs of a material to be printed 106 and a conduit 108 between the reservoir and the print head that dispenses the material 110. The material is provided to the print engine and the print engine dispenses it according to the tool paths and produces the printed item. For a print simulator, the simulator generates an image according to the tool paths. In either case, the tool paths may be provided to the controller/process of the print system by a planning computer 112. The planning computer may or may not be provided as part of the overall print system consisting of the controller/processor and the print engine. The planning computer executes software that lays out the tool paths in accordance to the principles established above.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-implemented method of generating a tool path for an additive manufacturing process, the tool path having an input polygon for a thick region, and an input path for a wire region, the method comprising:
   offsetting the input polygon by a minimum step over distance, creating a set of contour parallel offset lines;
   computing path segments from a medial axis transform of the input polygon;
   computing a dilation of the medial axis path by a radius approximately half the step over distance, producing a dilated medial axis;
   clipping the contour parallel offset paths by the medial axis path, producing clipped contour parallel paths; and
   recursively connect the medial axis paths with the clipped contour parallel paths.

2. The computer-implemented method of claim 1, wherein the tool path forms a zig-zag pattern.

3. The computer-implemented method of claim 1, wherein the tool path forms a contour spiral pattern.

4. The computer-implemented method of claim 3, wherein clipping the contour parallel offset paths comprises:
   identifying which contour parallel offset paths are contained within other contour parallel paths; and
   creating a tree structure out of the contour parallel paths such that a given path is identified as a child of another path if all vertices and edges are contained within a parent path.

5. The computer-implemented method of claim 4, further comprising:
   creating a line between edges of each loop in the tree structure to a highest grandparent to create nested loops;
   dilating the edge; and
   clipping the nested loops.

6. The computer-implemented method of claim 5, further comprising connecting paths that lie in a same direction to form a spiraling pattern.

7. The computer-implemented method of claim 6, further comprising clipping the spiraling pattern by a dilated medial axis path and connecting nearest neighbor paths.

8. The computer-implemented method of claim 1, wherein computing path segments from the medial axis transform comprises:
   skipping medial axis edges that touch a region boundary; and
   keeping portions of the medial axis edges the meet a minimum distance requirement.

9. The computer-implemented method of claim 1, wherein recursively connecting the medial axis paths comprises:
   only connecting paths that are within a threshold distance of each other;
   only connecting paths between vertices that do not already have a connection; and
   only connecting paths that have orientations in opposite directions.

10. A computer-implemented method of generating a zig-zag tool path for an additive manufacturing process, the tool path having an input polygon for a thick region, and an input path for a wire region, the method comprising:
    offsetting the input polygon by a minimum step over distance, creating a set of contour parallel offset lines;
    computing path segments from a medial axis transform of the input polygon;
    computing a dilation of the medial axis path by a radius approximately half the step over distance, producing a dilated medial axis;
    connecting paths that lie in a same direction to form a spiraling pattern;
    clipping the contour parallel offset paths by the medial axis path, producing clipped contour parallel paths; and
    recursively connecting the medial axis paths with the clipped contour parallel paths.

11. A computer-implemented method of generating a contour parallel tool path for an additive manufacturing process, the tool path having an input polygon for a thick region, and an input path for a wire region, the method comprising:
    offsetting the input polygon by a minimum step over distance, creating a set of contour parallel offset lines;

computing path segments from a medial axis transform of the input polygon;

computing a dilation of the medial axis path by a radius approximately half the step over distance, producing a dilated medial axis;

clipping the contour parallel offset paths by the medial axis path, producing clipped contour parallel paths; and recursively connecting the medial axis paths with the clipped contour parallel paths such that only paths that are within a threshold distance of each other are connected.

12. The computer-implemented method of claim 11, wherein recursively connecting the medial axis paths comprising:

only connecting paths between vertices that do not already have a connection; and only connecting paths that have orientations in opposite directions.

* * * * *